3,225,028
ACROLEIN ADDUCTS OF POLYGALACTOMANNANS AND POLYGLUCOMANNANS AND PROCESS OF PREPARING SAME
Robert Nordgren, 79 Seymour Ave. SE., Minneapolis, Minn.
No Drawing. Filed June 11, 1962, Ser. No. 201,305
10 Claims. (Cl. 260—209)

This invention relates to derivatives of polygalactomannans and polyglucomannans and to the process of preparing same. More particularly, it relates to acrolein adducts of polygalactomannan and polyglucomannan gums, the process of preparing said adducts and the use thereof as strength improving additives for paper.

Wet-strength, as it has come to be known in the manufacture of paper articles, is of importance in two major types of products. Wet-strength which does not sacrifice absorbency is required in the manufacture of disposable tissues and paper towels. On the other hand, in the manufacture of such items as beverage cases, cardboard cartons, paper board, and the like, a wet-strength of quite a different type is required. Where the article must withstand continued or repeated contact with water, or must perform in highly humid atmospheres, a more or less permanent wet-strength is necessary. Most of the known wet-strength resins are of this latter type, that is, they water-proof the paper and thus make it undesirable for absorbent use such as disposable tissues and paper towels. Also, since such resins give relatively permanent wet-strength to the paper, repulping thereof is not possible in most cases.

I have now discovered new compositions of matter which are particularly useful as strength improving additives for paper, especially for products which are to be used as disposable tissues, paper towels and the like. Such new compositions of matter are the acrolein adducts of polygalactomannans, polyglucomannans and mixtures thereof. When used as additives for paper, they improve both dry and wet-strength without water-proofing the paper. Additionally, paper containing such adducts has high water absorbency and may be readily repulped. It is, therefore, an object of this invention to provide novel acrolein adducts of polygalactomannans and polyglucomannans.

Another object of the invention is to provide a process for preparing said novel compositions of matter.

Still another object of the invention is to provide paper having improved strength by inclusion therein of said adducts.

These and other objects will become apparent from the following detailed description.

The adducts of the present invention are prepared by reacting acrolein with any of a variety of polygalactomannans and polyglucomannans. The polygalactomannans are polysaccharides composed principally of galactose and mannose units and are usually found in the endosperm of leguminous seeds, such as guar, locust bean, honey locust, flame tree, and the like. Guar flour, for example, is composed mostly of a galactomannan which is essentially a straight chain mannan with single membered galactose branches. The mannose units are linked in a 1-4 β-glycosidic linkage and the galactose branching takes places by means of a 1-6 linkage on alternate mannose units. The ratio of galactose to mannose in the guar polymer is, therefore, one to two. Locust bean gum is also a polygalactommanan gum of similar molecular structure in which the ratio of galactose to mannose is one to four. Guar and locust bean gum are the preferred sources of the polygalactomannans, principally because of the commercial availability thereof.

The polyglucomannans are also polysaccharides but are composed principally of glucose and mannose units. They are usually found in the corms of plants of the Araceae family, such as *Amorphophallus oncophyllus*, from which the product known as iles mannan is obtained, and *Amorphophallus rivieri* from which konnyaku flour is obtained. The latter polyglucomannan is preferred because of the availability thereof.

The proportions of the reactants can vary over a relatively wide range. Preferably, about 0.25 to 1.0 equivalents of acrolein are used for each equivalent of anhydrous hexose unit in the polygalactomannans and polyglucomannans. Larger or smaller amounts can be used. However, when more than about 1.0 equivalent of acrolein is employed, some difficulty is encountered in removing the excess from the reaction mixture. Additionally, no further improvements in wet strength are obtained by the use of larger amounts. When less than about 0.25 equivalent is used, the resulting adducts have reduced paper strength improving properties.

The reaction can be conducted at atmospheric pressure and at relatively moderate temperatures, such as from about 25 to 100° C. At low temperatures (i.e., 25° C.), the reaction proceeds very slowly. At high temperatures (i.e., 75–100° C.) the reaction proceeds rapidly but it may be necessary to use pressure in order to keep the acrolein in the reaction flask. Acrolein boils at 52° C. and thus a preferred reaction temperature is from about 30 to 60° C. Pressures of a few to 30 or more p.s.i. can be used.

The polygalactomannan or polyglucomannan and acrolein can be reacted to form the adducts of the present invention without adding any other material to the reaction mixture. However, the reaction is preferably conducted in the presence of water and/or fluidizing solvents. The amounts of the water and/or solvent can vary over relatively wide limits. Thus enough water to swell, but not to solubilize, the polygalactomannan or polyglucomannan can be used. Amounts of about 10 to 90% by weight based on the total weight of the reaction mixture give especially good results.

If a solvent is used, it should be inert. Examples of suitable solvents are secondary and tertiary alcohols, such as isopropanol and tertiary butyl alcohol. Said solvent should be used in an amount sufficient to aid in the fluidization of the reactants and thus to facilitate the reaction. Again the amount thereof can vary widely but will generally be within the range of about 10 to 90% by weight based on the total weight of the reaction mixture. It is also understood that both water and the solvent can be used at the same time.

A catalyst is preferably used to increase the rate of reaction. Suitable catalysts include primary, secondary, and tertiary amines, polyamines, and the like, including amphoteric amine compounds. These amines can be aliphatic or aromatic or mixed alphatic and aromatic, including carbocyclic and heterocyclic. By the term "amphoteric amine compound" as used herein is meant an amine of the classes listed above which also contains in the molecule an acidic hydrogen atom connected to a carbon atom through an oxygen atom, as in the case of the amino-acids and aminophenols, for example. Representative of useful amines are the following: mono-, di-, and tri-alkyl amines such as monoethylamine, dipropylamine, tributylamine, monoheptylamine and the like; aniline, diphenylamine, orthotoluidine, acetanilide, monomethylaniline, dimethylaniline and other aryl and alkyl-substituted arylamines; mono-, di- and tri-alkylolamines, such as monoethanolamine, dipropanolamine, monoheptanolamine and the like; mono- and di-alkyl substituted mono- and di-alkylolamines, such as monoheptyl diethanolamine; aliphatic and aromatic polyamines such as diethylenetriamine, triethylene tetramine, orthophenylenediamine and the like; and amphoteric amine compounds such as glycine, beta-alanine, anthranilic acid, aminophenols and the like. In fact, any amine which shows catalytic activity can be used and practically all amines do show such activity. Preferably, the amines contain about seven or less carbon atoms in each group attached to the nitrogen atom. The concentration of the catalyst is not critical. However, it is preferred to use the catalyst in amounts of about 0.05 to 1 percent by weight based on the weight of the total reaction mixture.

The reaction is carried out under essentially neutral conditions. Thus, the acrolein and polygalactomannan and/or polyglucomannan are reacted under conditions wherein the pH of the reaction mixture is in the range of about 4.5 to 7.5, and preferably just below 7.0. When an amine catalyst is used, the hydrogen ion concentration can be controlled by adding to the reaction mixture a suitable amount of an acid to bring the pH within the specified range. For this purpose a wide variety of carboxylic acids are suitable. Representative thereof are formic, acetic, propionic, butyric, valeric, hexanoic, heptanoic, octanoic, oxalic, succinic, benzoic, and the like. Although the amine and acid can be added separately in amounts sufficient to maintain the desired pH, salts of the amines and acids can be initially added. If the pH of the resulting reaction medium does not fall within the defined limits, additional amine or acid can be added. I have found that the use of other catalysts, such as alkali metal hydroxides or acids alone, are not suitable. When the reaction is carried out using such materials, the resulting adducts can not be solubilized and thus are of no use in paper manufacture.

There is nothing critical in the sequence in which the reactants, catalyst, water and/or solvent are admixed. Thus for example the catalyst can be added to the polygalactomannan with or without water and/or solvent, followed by addition of the acrolein.

The adducts of the present invention are particularly useful as additives for paper. They can be applied to a wide variety of fibrous cellulosic materials, such as those commonly referred to as sulfite, soda, sulfate, and ground wood stock, or fibers derived from rag, cotton, bast, flax, and stem fibers such as straw, or from repulped broke.

Various methods can be used in the application of the adducts to the fibrous cellulosic materials. Thus, the adducts can be solubilized by reaction with sodium bisulfite or dilute acids which can be inorganic or organic. Preferably, solubilization is effected by the use of sodium sulfite. The amount thereof can vary widely but should be about one mole or more per mole of acrolein used in the adduct preparation. The resulting aqueous solutions, containing for example 0.5 to 20% by weight of the solubilized adduct, can be used to impregnate felted cellulosic products by tub application methods wherein the partially dried articles is immersed in the aqueous solution so that the paper is impregnated with about 1–10% by weight of the adduct based on the dry weight of the paper. The paper is then processed in the conventional manner. It is possible also to spray the formed paper product with the aqueous solution or dispersion of the adduct.

Preferably, however, the aqueous solution or dispersion is added to the pulped and refined cellulosic fiber. The adduct is added in the beater, stock chest, head box or at any suitable point ahead of the actual paper-forming operation. Conditions are adjusted so as to obtain a concentration of about 0.1 to 10% based on the dry weight of the fibers. The concentration of the adduct in the beater, for example, would be in the range of about 0.01–1% based on the pulp mixture.

The adducts of the present invention may be used alone or in conjunction with other additives commonly used in the manufacture of paper articles. The combination may be added as a solution or a dispersion in water, in water/alcohol or other suitable solvent. The individual components may be added separately to the pulp mixture.

The following specific examples are furnished for the purpose of illustration only and are not to be construed as placing any limitations on the scope of the present invention. The following standard procedure was employed to evaluate the adducts of the examples as strength improving additives for paper: 360 grams (moisture free basis) of bleached kraft fibers were added to 24 liters of tap water and vigorously agitated for two hours. The pulp mixture was beaten in a Valley Laboratory Beater for 35 minutes to a freeness near 700 S.R., and then diluted with 24 liters of tap water. The adducts were reacted with sodium bisulfite and added to the pulp mixture as 1% by weight aqueous solutions. In every case 0.6 gram of additive was added to three liters of the pulp mixture and this amount of additive is equal to about 2.5% of the dry pulp weight. Hand sheets were then formed from each liter of pulp mixture, so each result given in this application is the average wet-strength burst value of three sheets. The bisulfite-adduct reaction products were mixed with the pulp mixture and pH modifier (i.e., hydrochloric acid) for 10 minutes before the hand sheets were prepared. Said sheets were formed with a Noble and Wood Sheet Machine, conditioned overnight or longer at 73° F. and 50% R.H., immersed in distilled water exactly 15 minutes, and wet burst values measured. The wet burst value is expressed in units of pounds burst per 100 pounds of ream weight, 25 x 40 x 500. Sheets were run in triplicate. Ten burst values were obtained from each sheet for wet burst and also for dry burst, where the latter was measured.

*Example I*

To a one liter Hastalloy autoclave fitted with a stirrer were added 100 g. guar flour (approximately 81% polygalactomannan or 0.50 mole) and 14 g. acrolein (0.25 mole or 0.5 equivalent per equivalent of polygalactomannan). The autoclave was sealed and stirred for 16 hours at 29° C. Excess acrolein was removed under vacuum to leave a dry powder weighing 102 grams. Five grams of the powder were mixed with five grams sodium bisulfite in 50 cc. of warm water until a paste was formed. The paste was then diluted with 500 cc. water to form a 1% by weight solution of the bisulfite-adduct reaction product. When this solution was added to the pulp mixture in the manner described above, the resulting hand sheets had a wet burst value of 15 pounds. Paper hand sheets prepared from a pulp mixture which did not contain the additive had wet burst values of 0.

*Example II*

Into an 8-quart Patterson-Kelley Twin-Shell Blender was added 1500 g. guar flour, the blender was closed and 1000 g. water containing 5 cc. catalyst (72% triethylamine formate in methanol) was added by means of a liquid feeder which allowed the water to be added in small droplets. The material produced in the blender was in the form of granules of swollen guar flour that had the rubbery qualities of an "art gum eraser" after it has been worn into small pieces. To this material in the blender was added 105 g. acrolein (0.25 equivalents per equivalent of polygalactomannan). The blender was run for 45 minutes and allowed to stand overnight. All but 500 g. of the adduct was removed from the blender and to this 500 g. was added 78 g. of sodium bisulfite. The blender was again tumbled for about three hours and then the bisulfite-adduct reaction product was removed and air dried overnight. Paper hand sheets were prepared from a 1% by weight solution of the product in the same manner as set forth above and in Example I. The sheets had a wet burst value of 23 pounds.

Example III

Into the same blender as used in Example II were added the following: 1500 g. guar flour, 1500 g. water, 15 cc. catalyst (same as in Example II) and 84 g. acrolein (0.2 equivalent per equivalent of polygalactomannan). The blender was run for two hours, during which time the mechanical mixing warmed the contents to 40–50° C. The blender was allowed to stand overnight and then 249 g. sodium bisulfite was mixed with the adduct. The resulting bisulfite-adduct reaction product was air dried and used as an additive for paper as described above. The paper had a wet burst value of 23 pounds.

Example IV

Fourteen hundred g. guar flour, 1400 g. water and 14 cc. catalyst (same as in Example II) were mixed in the blender described in Example II. Two hundred two g. of the resulting blend and 28 g. acrolein (1.0 equivalent per equivalent of guar) were added to a Readco Z blade mixer. The mixer was sealed and run for three hours at 43° C. Excess acrolein was removed by water pump vacuum, the mixer was opened and 20 g. of the acrolein-polygalactomannan adduct was removed. To the remainder of the adduct was added 31 g. sodium bisulfite. Mixing was continued for one hour and then the bisulfite-adduct reaction product was allowed to stand overnight. After air drying, the product was used to increase the strength of paper as described in Example I. A wet burst value of 29 pounds was obtained.

Example V

Example IV was repeated using 1000 g. guar flour, 1455 g. water, and 45 cc. catalyst (same as in Example II). Two hundred sixty-three grams of the blend and 28 g. acrolein were placed in the Readco Z blade mixer. The mixer was sealed and run for 4.5 hours at 40–42° C. Then the excess acrolein was removed under vacuum and after 26 g. of the acrolein-polygalactomannan adduct was removed, 31 g. sodium bisulfite was added. Mixing was continued for 30 minutes and then the bisulfite-adduct reaction product was allowed to stand overnight. After drying, the product was used to increase the strength of paper as described in Example I. A wet burst value of 33 pounds was obtained.

Example VI

Example IV was repeated using 1000 g. locust bean flour, 1450 g. water and 50 cc. catalyst (same as in Example II). Two hundred fifty grams of the resulting blend containing 100 g. locust bean flour and 28 g. acrolein were placed in the Readco Z blade mixer. The mixer was sealed and run for three hours at 46° C. Excess acrolein was removed under vacuum and then a 25 g. portion of the adduct was removed. To the remainder of the adduct was added 31 g. sodium bisulfite. Mixing was continued for one hour and then the bisulfite-adduct reaction product was allowed to stand overnight. The product was air dried and used as a paper additive as described above. A wet burst value of 52 pounds was obtained.

Example VII

To a one-liter flask fitted with a stirrer, thermometer and reflux condenser were added 200 g. tertiary butyl alcohol, 50 g. guar flour, 350 g. water, 10 cc. catalyst solution (80% triethylamine acetate in methanol) and 14 g. acrolein (1.0 equivalent per equivalent of polygalactomannan). The reaction mixture was stirred and heated for four hours at 40°–49° C. The resulting adduct was filtered, resuspended in methanol, filtered and dried. When used as a strength improving additive for paper, a wet burst value of 28 pounds was obtained.

Example VIII

Into the same type flask as used in Example VII were charged 200 g. methanol, 50 g. guar flour, 500 g. water and 14 g. acrolein. The mixture was stirred and heated for 15 hours at 50° C. and then treated exactly as the adduct of Example VII. Hand sheets containing the bisulfite-adduct reaction product had a wet burst value of 29 pounds.

Example IX

Example VII was repeated using the following: 100 g. isopropanol, 50 g. guar flour, 250 g. water, 3 cc. catalyst solution (same as in Example VII) and 14 g. acrolein. This mixture was stirred and heated for 5.5 hours at 49°–62° C. The wet strength of paper was increased by the addition of the resulting bisulfite-adduct reaction product to 28 pounds.

Example X

Example VII was repeated using the following: 100 g. isopropanol, 50 g. guar flour, 250 g. water, 10 cc. catalyst solution (same as in Example VII) and 10.5 g. acrolein (0.75 equivalent per equivalent of guar). This mixture was stirred and heated for 16 hours at 51° C. The wet burst value produced by the bisulfite-adduct reaction product was 30 pounds.

Example XI

To 100 g. of Konjac mannan gum (a polyglucomannan) in a one-quart Readco Z blade mixer were added 150 ml. water containing 2 ml. catalyst made from 1.1 moles acetic acid and 1.0 moles triethylamine. The addition was made dropwise from a buret. After this addition, 28 g. acrolein was added and the mixer sealed and heated at 49° C. for three hours. A water pump vacuum then applied for 15 minutes, the mixer was opened and 25 g. of the adduct removed. To the remainder of adduct was added 90 g. sodium bisulfite. Mixing was continued for 30 minutes and then the bisulfite-adduct reaction product was transferred to a glass jar and stored for three hours. The product was of dried, ground to pass a 35 mesh screen and added to water to form a 1% by weight solution. When this solution was used as an additive for paper as described in Example I, a wet burst value of 65 was obtained.

The above examples show that the adducts of the present invention are valuable as strength improving agents for paper. In addition to increasing the wet strength thereof, they also increase the dry strength. For example, the bisulfite-adduct reaction product of Example VII increases the dry strength of paper about 20%. The paper containing the adducts is also highly absorbent and can be readily repulped. In contrast polyglucomannans of polygalactomannans per se, such as guar gum, do not increase the wet strength of paper to any significant degree. As is also evident from the examples, the adducts can be prepared by simply reacting the polygalactomannan or polyglucomannan and acrolein without other agents being present or the reaction can be carried out in the presence of catalysts, water and/or solvents such as alcohols.

It is to be understood that the invention is not to be limited to the exact details of operation or the compositions and methods shown and described, as obvious modifications will be apparent to those skilled in the art and the invention is to be limited only by the scope of the appended claims.

The embodiments of the invention in which an exclusive property or privilege is claimed are defined as follows:

1. A process of preparing an adduct of acrolein and a material selected from the group consisting of polygalactomannans, polyglucomannans and mixtures thereof which comprises reacting the material with about 0.25 to 1.0 equivalent of acrolein for each equivalent of anhydrous hexose unit in the material, said reaction being carried out at a temperature of about 25 to 100° C. and the pH of the reaction mixtures being in the range of about 4.5 to 7.5

2. The process of claim 1 wherein the reaction is carried out in the presence of a material selected from the group consisting of water, inert organic solvent, amine containing catalyst and mixtures thereof.

3. The process of claim 2 wherein the catalyst is an amine salt of a carboxylic acid.

4. The process of claim 1 wherein the material is a polygalactomannan.

5. The process of claim 4 wherein the polygalactomannan is guar gum.

6. The process of claim 4 wherein the polygalactomannan is locust bean gum.

7. The process of claim 1 wherein the material is a polyglucomannan.

8. The adduct prepared by the process of claim 1.

9. A reaction product of sodium bisulfite and the adduct prepared by the process of claim 1.

10. The reaction product of claim 9 wherein about 1 mole of sodium bisulfite is used for each mole of acrolein in the adduct.

References Cited by the Examiner

UNITED STATES PATENTS

| | | | |
|---|---|---|---|
| 2,258,628 | 10/1941 | Smith | 162—178 |
| 2,461,502 | 2/1949 | Moe | 260—209 |
| 2,644,752 | 7/1953 | Frisch et al. | 162—178 |
| 2,679,268 | 3/1959 | Jullander | 260—209 |
| 2,956,963 | 10/1960 | Baird | 260—209 |
| 3,042,668 | 7/1962 | Monti et al. | 260—209 |
| 3,098,869 | 7/1963 | Borchert | 260—209 |

LEWIS GOTTS, *Primary Examiner.*

CHARLES B. PARKER, *Examiner.*

UNITED STATES PATENT OFFICE
CERTIFICATE OF CORRECTION

Patent No. 3,225,028                          December 21, 1965

Robert Nordgren

It is hereby certified that error appears in the above numbered patent requiring correction and that the said Letters Patent should read as corrected below.

Column 6, line 37, for "of" read -- air --; line 74, for "mixtures" read -- mixture --; column 8, line 10, for "2,679,268" read -- 2,879,268 --.

Signed and sealed this 10th day of January 1967.

(SEAL)
Attest:

ERNEST W. SWIDER                        EDWARD J. BRENNER
Attesting Officer                               Commissioner of Patents